United States Patent [19]

Bernasconi

[11] 4,086,690

[45] May 2, 1978

[54] METHOD AND APPARATUS FOR PRODUCING A ROTOR WELDED TOGETHER FROM DISCS

[75] Inventor: Felix Bernasconi, Zollikerberg, Switzerland

[73] Assignee: BBC Brown, Boveri & Company Limited, Baden, Switzerland

[21] Appl. No.: 680,801

[22] Filed: Apr. 27, 1976

[30] Foreign Application Priority Data

Jun. 19, 1975 Switzerland ............... 7980/75

[51] Int. Cl.² .......................................... B23P 15/00
[52] U.S. Cl. .............................. 29/156.8 R; 219/72; 228/48; 416/213 A
[58] Field of Search ............ 29/156.8 R; 228/48, 228/219, 231, 169, 178, 182; 219/72, 121 EB, 124, 125; 33/174 Q; 416/213

[56] References Cited

U.S. PATENT DOCUMENTS

| 1,672,126 | 6/1928 | Hodgkinson | 29/156.8 R |
|---|---|---|---|
| 2,317,092 | 8/1943 | Allen | 228/169 |
| 2,470,404 | 5/1949 | Kloos | 33/174 Q |
| 2,637,521 | 5/1953 | Constantine et al. | 29/156.8 R |
| 2,758,367 | 8/1956 | Dougherty | 228/48 |
| 2,834,097 | 5/1958 | Eichenberg et al. | 228/231 |
| 3,067,490 | 12/1962 | Lüthy et al. | 29/156.8 R |
| 3,440,392 | 4/1969 | Erlandson et al. | 219/121 EB |
| 3,480,158 | 11/1969 | Pandjiris et al. | 228/48 |
| 3,488,830 | 1/1970 | Miller | 228/178 |
| 3,539,760 | 11/1970 | Rudd | 219/121 EB |
| 3,586,812 | 6/1971 | Fisher | 219/72 |
| 3,590,454 | 7/1971 | Brass | 416/213 |
| 3,626,140 | 12/1971 | Peyrot | 219/121 EB |
| 3,734,387 | 5/1973 | Sannipoli | 228/48 |

FOREIGN PATENT DOCUMENTS

| 2,324,388 | 2/1974 | Germany | 29/156.8 R |
|---|---|---|---|
| 521,451 | 3/1955 | Italy | 416/213 |
| 646,483 | 11/1950 | United Kingdom | 416/213 |

Primary Examiner—E. M. Combs
Assistant Examiner—Daniel C. Crane
Attorney, Agent, or Firm—Burns, Doane, Swecker & Mathis

[57] ABSTRACT

A method for producing a rotor made from discs joined together in succession in side-by-side relation by welding comprises the steps of assembling each rotor disc and the succeeding disc next to be joined such that their axes are in horizontal alignment, pressing the two discs together thereby to place their interfaces under axial pressure, pre-heating each two discs to be joined to the proper working temperature, joining the discs by welding in a circumferentially extending welding seam while maintaining the pressure, repeating the assembling, pre-heating and welding operations until all of the discs have been welded together to establish the complete rotor, thereafter heat-treating the completed rotor, and finally subjecting the completed rotor to a hot true-running test. All of these operations take place within a common heating box into which hot air is introduced to effect the heating. The apparatus for performing the method features a trolley located within the heating box and on which each next-to-be-welded-on disc is carried into face-to-face pressure contact with a previously welded-on disc. The end discs of the rotor are provided with shaft extensions and the latter serve to support the rotor on rests in order to carry out the running and truing operations. The heating box is constituted by a number of axial modules joined together in succession as the discs are welded together in succession to provide a correspondingly increasing axial length.

17 Claims, 8 Drawing Figures

METHOD AND APPARATUS FOR PRODUCING A ROTOR WELDED TOGETHER FROM DISCS

This invention relates to an improved method for producing a rotor welded together from a number of discs, the discs being brought together in succession with their axes horizontal in an apparatus and welded, such that on each occasion the particular two discs to be joined are positioned in side-by-side relation; they are then pressed together axially until the interfaces to be welded are in contact, and joined together by welding while an axial pressure is maintained; the invention further concerns an apparatus for implementing the method and a rotor welded according to the method.

A method of this general kind and the corresponding equipment are known from a German patent application DT-OS No. 2,324,388; the method is claimed to result in great accuracy of manufacture, and the apparatus in lower capital cost than for welding installations comprising several work positions.

According to the known method, rotor parts in the form of discs are successively joined together with a root weld on a suitable rig. After all the individual parts have been joined to form a rotor (a rotor 12 m long is mentioned, comprising 11 discs and 200 t in weight), this is lowered onto two rests, where it is freely supported. The rig, in effect a "welding table," is then partly dismantled in order to allow the unimpeded approach of the heating and welding equipment, not further described.

To avoid preheating of the discs, all the parts to be welded are provided, in the region of the root weld zone, with an annular groove which is filled with a material not further described, but more ductile than the disc metal (i.e., plastic metal which is squeezed when the two discs are pressed together). This is claimed to give the rotor particular elasticity in the direction of its longitudinal axis, and to eliminate the occurrence of fatigue cracks during operation.

A principal object of the invention is to create a method whereby rotor parts of materials which must without fail be preheated for purposes of welding, such as DIN 21 Cr Mo V 511, can be joined to form a rotor without the need for extraneous materials which also have to be welded. The concept underlying the apparatus to implement the method is the attainment of short process times for all steps of the method.

This object is achieved in that in successive operations in one and the same apparatus, the individual discs are preheated, centered and welded, and the complete rotor is heat-treated and subjected to a hot true-running test.

The apparatus, which in addition to a first fixed position shaft mounting incorporates a mounting able to move in the axial direction of the rotor in order to support and locate in space each of the discs to be welded, and also a clamp assembly similarly able to move axially, both the movable mounting and the clamp assembly being preferably fitted on a common trolley, and which further is provided with at least one rest to support the rotor parts already joined by welding and also a shaft-turning gear, is supplemented in accordance with the invention in that the rotor parts already welded and also at least one of the discs still to be welded are surrounded by a heating box, and outside the heating box a second, axially movable shaft mounting is provided to support the fully welded rotor.

As the spatial location is performed with a single support, the rotor elements must be of a form allowing them to be aligned without difficulty; this is achieved in that the discs are centered with respect to each other at their centers by a boss located at the disc center, the boss diameter amounting to some 5 to 20% of the diameter of the circumferential weld.

The advantages of the invention are as follows:

To carry out the method the rotor needs to be neither tipped, removed nor laid down. It remains for the whole time in the same apparatus. If welding defects are discovered during the various welding operations, the faulty welds can be cut out immediately when they are found, and re-welded. The possibility of the final hot true-running test is considered particularly beneficial.

The apparaus meets the set objective of short process time. It also requires little space, relatively low capital investment and, as an especially favorable feature, incorporates the heating box, which provides the different quantities of heat needed for preheating, welding, stress-relieving and for the hot true-running test.

The rotor, composed preferably of discs aligned at their centers, is simple to weld inasmuch as the interfaces are required only to provide a matching fit, but need not ensure central alignment. Owing to the absence of a root centering device, when making the root weld there is no need to oscillate the welding electrode, thus allowing a greater welding speed in the circumferential direction.

Examples of the invention are illustrated in simplified form in the drawings, in which.

The drawings of the apparatus are only schematic, and show only those components essential to an understanding of the invention. Thus in FIG. 1, for the sake of simplicity the auxiliary equipment required to make the welds, such as welding torch, wire feed, wire feed jaws, and the like, are omitted. In FIG. 2 the chip-removing machine tool and the measuring instruments for checking true-running are not shown.

Figure 1:
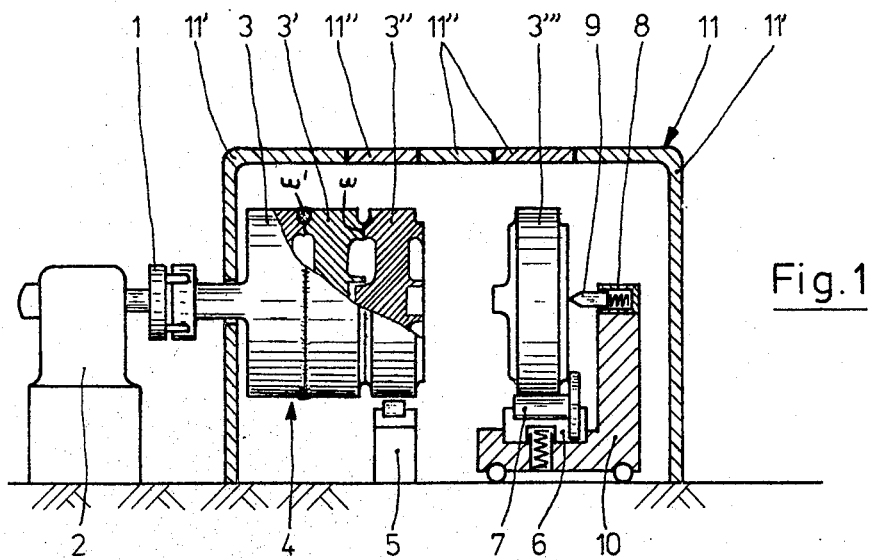
FIG. 1 shows schematically the apparatus as assembled for preheating and welding.
Figure 2:
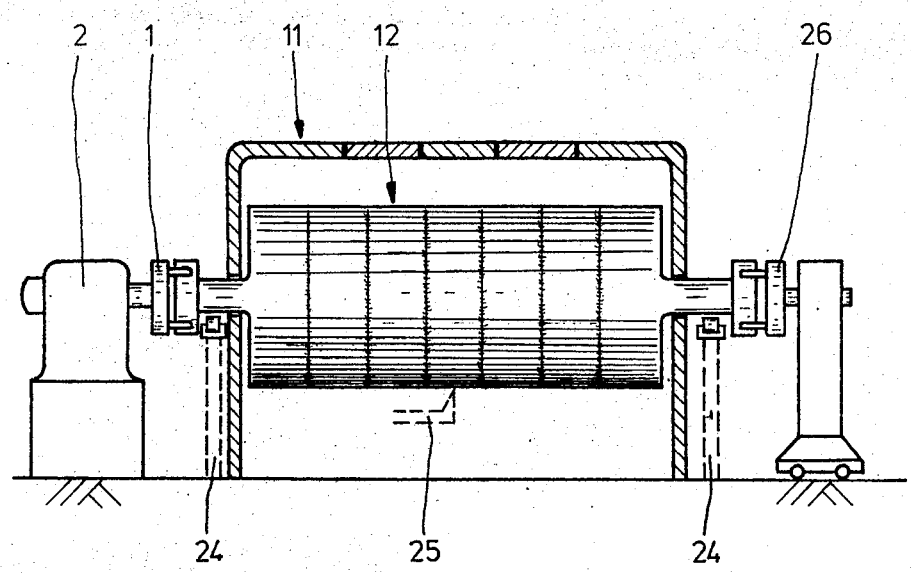
FIG. 2 shows schematically the apparatus as assembled for heat treatment and true-running testing.

FIG. 1 shows the apparatus assembled for the phase of applying the filler weld. Numeral 1 denotes a fixed, i.e., longitudinally stationary shaft mounting which is carried in the pedestal 2 containing a shaft-turning drive (not shown). The partially completed rotor part 4 composed of solid discs 3, 3', 3", partly with completed welds, is held in shaft mounting 1. Disc 3", joined to disc 3' by only a root weld, is supported by means of a roller rest 5. The moving mount 6 incorporates a spring-loaded rest 7 adjustable in height, and is fitted with the movable clamp assembly 8, which preferably is provided with a spring-loaded center 9, on a common trolley 10. Instead of the springs, of course, hydraulic or other means of support and clamping could be employed. Not shown is the support in the direction of movement of the trolley required during the phase of pressing two discs together (for example 3" and 3'''). For the purpose of preheating, the next-to-be-welded on isc 3''' is mounted on rest 7. The rotor part 4 and the trolley 10 are located inside the heating box 11 which, in its simplest form, consists of the two end wall structures 11' between which are located side-by-side wall modules, elements 11", of uniform longitudinal dimensions. A very simple construction of this kind allows the heating box to be adapted as required to different lengths of rotor. The longitudinally extending portions of the end wall structures 11' can then be of such dimensions that with rotors of the shortest possible length, the heating box needs no intermediate wall elements 11". This situation can occur in particular when welding the first two discs 3 and 3'.

Figure 7:
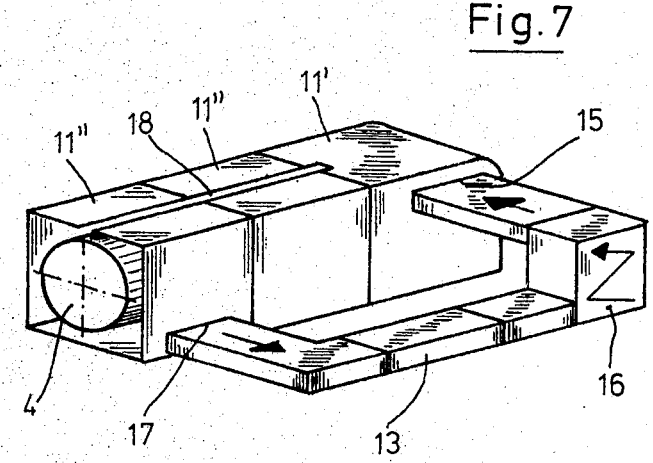
FIG. 7 is a sketch of the heating box.

FIG. 7 shows schematically the construction of a heating box with which rotor parts are heated by convection. This form of preheating is particularly beneficial for the following reasons: known heating boxes, for example hot true-running test ovens, operate as a rule with zone-controlled electric radiant heating or gas heating. In the lower temperature ranges, at which the rotor parts have not yet oxidized, the absorption of heat with heating methods of this kind is very much dependent on the absorptive capacity of the disc surface. With convective heating, radiation to the approximately evenly heated oven wall is marked only from about 500° C; temperatures above 500° C are needed only for stress-relieving and testing for true running, but not for preheating.

In FIG. 7, components identical to those in FIG. 1 are denoted by the same reference symbols. The end wall section 11' with hot-air inlet 15 is preferably at the same end of the apparatus as the rotor turning gear. A blower located in enclosure 16 draws air along the duct 13, which can also be extended with modular elements, and passes it through the heater unit indicated in enclosure 16, and then into the heating box 11. The hot-air inlet 15 is positioned so that the air impinges tangentially on the rotor part 4. The intake branch 17 is preferably located on the end section not shown, contrary to the illustration in FIG. 7 where for reasons of clarity it is situated on a modular jacket element 11". Running along the top of the heating box 11 in the direction of the rotor axis is a slot 18, which is considered further below.

During the first stages, namely preheating, centering and welding in the same apparatus, the sequence of operations is as follows:

The shaft end, in the present case the rotor disc 3 (FIG. 1) is clamped in the shaft mounting 1, preferably a faceplate, and supported by roller rest 5. The disc 3' to be joined to disc 3 is arranged on trolley 10, the weight of the disc beibng taken by the sprung rest 7. The diameter of rest 7, which is provided with rollers, can be adjusted in known manner, allowing the axis of disc 3' to be aligned exactly with that of disc 3. The disc centering device is also engaged in known manner by moving the trolley 10, the disc 3 rotating until the centering point 9 presses the interfaces of discs 3 and 3' axially together with a force such that, on rotation, disc 3' can no longer move in the centering device relative to disc 3. The heating box 11 is then assembled so that only the shaft mounting 1 is outside the box, whereupon preheating can begin.

Since the centering device and the preheating process are essential to the invention, these are described in more detail in the following paragraphs.

With some known methods, centering two discs to be welded together is a very delicate operation. External and rim-type methods of centering, for example, have the disadvantage that, owing to the large diameters of the mating surfaces, they must first be very accurately machined, giving rise to measuring difficulties, and then when the discs are stacked (the actual centering process), the female portion has to be slightly heated as a light press fit is usually involved.

Figure 3:
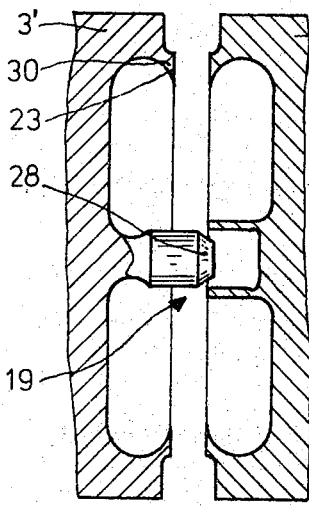
FIG. 3 illustrates one form of the centering boss.
Figure 4:
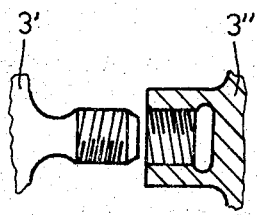
FIG. 4 is a first alternative of the arrangement shown in FIG. 3.

According to the present invention, an inner disc centering device 19 of small diameter is provided instead of a short, exacting disc centering device of large diameter. FIG. 3 shows such a spigot-type centering device with a boss and complementary recess, the greatest diameter of which is roughly equal to 5-20% of the outside weld diameter. In contrast to the limited depth of a welding-rim method of centering, the depth of the centering can be as deep as required. To facilitate engagement in the centering recess, the boss has a tapered end portion 28. FIG. 4 shows an arrangement in which the boss and recess of FIG. 3 are provided with male and female threads, respectively. Leaving aside the relatively high manufacturing costs, an arrangement of this kind has the advantage that after the two discs have been screwed together, they are held without further assistance.

Figure 5:
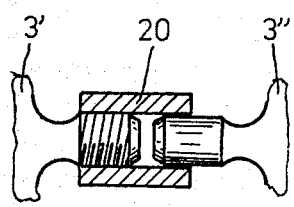
FIG. 5 is a second alternative of the arrangement shown in FIG. 3.

FIG. 5, finally, shows a low-cost combination of the two centering devices described above. Both discs are provided with bosses, a thread being cut in one of them. As intermediate piece 20 with a hole for the "smooth" boss can be screwed on this thread, and can be used for manipulation purposes, in addition to its function as a sleeve.

Not shown is a possible configuration in which the intermediate piece 20, in the same sense as the arrangement shown in FIG. 4, has a thread at both ends. It could be axially ductile, e.g., provided with a reduction in cross-section, or serve as a predetermined breaking point.

Figure 6:
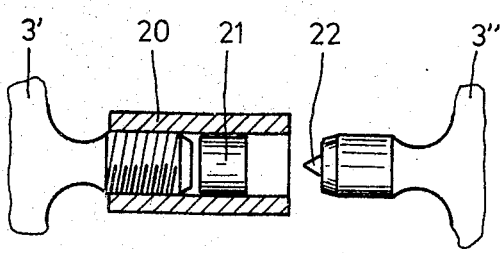
FIG. 6 shows a gas container in the centering boss of FIG. 5.

A further function ascribable to the intermediate piece 20 can be that of a place for keeping a gas container 21 (FIG. 6). As disc 3" is inserted in the centering device, the point 22 of the boss punctures the container 21, resulting in a simple method of making available the inert gas needed for the root weld. The construction can be such that the flow of gas to the weld site is prolonged and controlled.

Especially with low-alloy heat-treatable steels such as are used for rotors, heating prior to welding is very important because the subsequent welding process, with the material in the heat-affected zone close to the weld at an elevated temperature, inhibits the formation of brittle martensite, and a tough intermediate structure is formed. Also, preheating increases the rate of diffusion and escape of any hydrogen which might occur. The required preheat temperature depends on the so-called carbon equivalent, and as a rule lies between 150° and 400° C.

So that temperature differences greater than approximately 15° C between discs to be welded together can be evened out quickly and in good time, the rate of heating is less than about 30° C per hour. Temperatures during heating to the working temperature are usually monitored with thermocouples located in the weld gap on the sides of the joint or by means of thermoplie assemblies sliding on the surface, or comparative radiation pyrometers.

The holding time after the working temperature is reached depends on the greatest diameter of the rotor. It is necessary in order to attain a completely uniform temperature distribution over all the discs of a rotor before welding begins. As a rule, the minimum holding time is about 5 hours for rotors with a diameter of less than 500 mm. increasing by roughly an hour for each 100 mm increase in diameter. If the apparatus is fully occupied, under certain circumstances and for the reasons stated (long preheating time), the first two discs 3, 3' to be welded can be heated to the working temperature outside the apparatus, using conventional means (induction heating).

When the discs 3 and 3' have been aligned and heated to the working temperature, the next step is to make the root weld w. Throughout the welding procedure a force is exerted on disc 3' by means of clamp assembly 8. Preferably, the welding rims are melted using the TIG process with provision of extra wire. Owing to the inner centering device 19 (FIG. 3), the welding rims 23 have to ensure only a flush fit, and can therefore be located in a relieving buttress 30 extending towards the center around the radially inner contour of the interfaces to be welded, i.e., in a zone where the cyclic bending stresses applied to the rotor (e.g., a turbine rotor) when in operation, are of little influence. The welding rims 23 are accordingly in a zone almost devoid of load or stress, and hence any weld irregularities or defects are no longer a possible source of cracking.

It is convenient to weld only downwards, using a TIG welding facility. In accordance with FIG. 7, the electrode holder (not shown) together with the current supply and the welding-wire feed are brought to the welding site through the slot 18 in the heating box 11. If, owing to very large disc diameters, one tungsten electrode is not sufficient for one or two disc revolutions, this and the possible misalignment caused by welding on one side can be remedied by welding in a segment pattern.

When the root weld w has been completed, the unattached center 9 is withdrawn, rest 7 is lowered and the trolley 10 is run back away from the disc. The disc 3' is supported with rest 5, trolley 10 is loaded with disc 3", and the heating box is extended by one jacket element 11" and put into operation. Application of the filler weld w' is then begun, submerged arc welding being the method preferably employed. It is to be understood that when welding begins, the discs 3, 3' are again at the necessary preheat temperature. The power supply and wire jaws are again passed through the slot 18 in the heating box 11. Depending on the disc diameter and depth of joint, the filler weld takes between 10 and 50 hours per joint. During this time the disc 3" is in readiness inside the heating box 11, and is heated to the preheat temperature.

When the filler weld has been completed, disc 3' remains on rest 5, disc 3" is brought up on the trolley 10, aligned axially with the partially completed rotor 4, now comprising discs 3 and 3', until the rims 23 to be welded are in contact, whereupon they are pressed together and the cycle begins again with welding of the root weld w.

It is noteworthy that the heating box 11 needs to be longitudinally extended only between the operations "root weld" and "filler weld," but not when proceeding from the filling operation to application of the next root weld.

Owing to the very long time required for the filler weld, an interesting alternative consists in making two additional discs ready each time for preheating. Following application of a filler weld, these can be joined together immediately with a root weld, and when two more discs have been made ready and the heating box has been extended by two further wall elements 11", for example, two joints can then be filled simultaneously, using the submerged arc method.

This concludes the firt steps of the method to be preformed with the apparatus of FIG. 1.

FIG. 2 shows the apparatus assembled for the finishing operations, in this case for the phase of stress relieving. The broken lines indicate the roller-type or plain rests 24 needed later for the true-running test, and also the cutting tool 25 required for the true-running test and ultrasonic examination. The tool can be mounted for example on a travelling lathe carriage.

When welding is complete, dismantling of the trolley 10 begins, and the shaft end corresponding to the last disc welded is clamped in an axially movable shaft mounting 26, which preferably is also a faceplate. The rest 5 is then lowered, or all the rests 5 if the rotor owing to its length has been supported at several points, in which case the problems of rotor sag arising with every lathe cannot be avoided. The heating box 11 is assembled and sealed, and heating is commenced for the purpose of stress relieving. An important advantage here is that this heat treatment can be carried out using the heat of welding, without extensive cooling. Heating can begin with the rotor stationary, the rotor when being set into rotation at a later time.

The circulation of hot air in the heating box 11 has, in turn, the advantage of achieving a very uniform temperature distribution over the rotor surface. The rate of heating can thus be increased in comparison with other methods. The rotor is heated to about 30° C below the tempering temperature of its main material; this reduces the stresses brought about as a result of welding. The holding time at the stress-relieving temperature is predominantly a function of the rotor diameter.

When the stress-relieving heat treatment is completed, in order to avoid cooling stresses, the rate of cooling from the annealing temperature to room temperature is chosen to be about 30° C per hour. When room temperature is reached, preparations begin for the true-running test.

The tool 25 is used to machine sections for roller, or plain bearings at the shaft ends, and also a number of true-running control bands distributed along the rotor. The rotor is laid in the plain rests 24 and the sensors to check true-running (not shown) are placed in position. The cold true-running test then begins. When it is finished, the heating box 11 is again assembled, sealed and put into operation. The plain rests 24 are then outside the heating box 11 (FIG. 2). The rotor is run one or more times at a temperature selected in accordance with its subsequent operating temperature. This concludes the actual manufacture of the rotor composed of discs welded together.

It is to be understood that the invention is not restricted to what is shown in the drawings. Mention is made, for example, only of discs and shaft-end discs to be welded together; rotors of discs and/or drums can of course also be manufactured by the method and with the apparatus for its implementation.

Similarly, an additional step could be introduced into the sequence of operations, i.e., ultrasonic examination. This could be carried out, for example, with a cooled sensing head after the filler weld has been applied and while the rotor is still hot. After the heating box 11 has been partly dismantled and the rotor has been clamped in the movable shaft mounting 26, the welds are lightly machined with the tool 25; an operation essential to the test. Ultrasonic examination can, of course, also be carried out later with the rotor cold, for example, before the true-running test.

In contrast to the inner centering device shown, the method can also be carried out on the apparatus described with rotor components having centering devices of all possible kinds. Equally, a method other than the TIG method could be used for the root weld, for example electron beam welding, and for the filler weld another high-performance method instead of the submerged arc method, for instance MIG welding.

Figure 8:
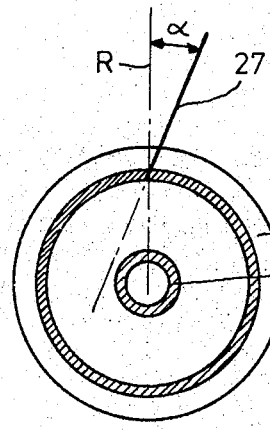
FIG. 8 shows a front view of a disc to be welded by means of electron beams.

In another alternative the root weld and filler weld described are replaced by a single electron beam weld. This operation would be carried out in a similar manner to the root weld, i.e., with the disc supported by the movable mounting 6 and clamped by the clamp assembly 8. Since with this procedure the trolley 10 is not available for the preheating process, the disc to be heated would have to be positioned in the heating box 11 in some other known manner. So as not to endanger the inner centering device 19, the electron beam 27, as shown in FIG. 8, should not point in a radial direction, the angle α being chosen so that the beam 27 passes close to the centering device 19. The considered radius R preferably coincides with the vertical axis of the disc.

In summary, it is noted that with the method of the invention it is possible to carry out all operations for the manufacture of a rotor — preheating, centering, applying the root weld, filling the welded joint, (electron beam welding), ultrasonic examination, rotational stress relieving, cold true-running test, hot true-running test — on one and the same apparatus, in contrast to known methods, which either require several work positions or dispense with preheating of the root weld, which has an important influence on the quality of the rotor.

I claim:

1. A method for producing a rotor made from solid discs of materials which must be preheated for the purpose of welding and joined together in succession in side-by-side relation by welding within a common apparatus including an axially extendible enclosure which comprises the steps of assembling each rotor disc and the succeeding disc next to be joined thereto such that their axes are in horizontal alignment and the discs are interconnected by centrally located centering means, pressing the two discs together in an axial direction thereby to place their interfaces under pressure, preheating each two discs to be joined to the proper working temperature, joining each two discs by welding them together in a circumferentially extending welding seam while maintaining the axial pressure, axially extending the enclosure to accommodate successive discs, repeating said assembling, preheating, welding and enclosure extending operations disc-by-disc until all of the discs required to form the complete rotor have been welded together, heat-treating the completed rotor, and finally subjecting the completed rotor to a hot true-running test, all of said operations being performed within said common apparatus.

2. The method as defined in claim 1 for producing a rotor made from weld-together discs wherein the discs are each provided with a boss located in the center of the disc for facilitating their horizontal axial alignment and centering, the diameter of the boss amounting to between 5% and 20% of the diameter of the circumferentially extending welding seam.

3. The method as defined in claim 1 for producing a rotor made from welded-together discs wherein each disc is provided with a centrally located boss which enters a centrally located recess in an adjacent disc in order to axially align, center and assemble the discs for welding together.

4. The method as defined in claim 3 wherein the boss on one disc and the boss receiving recess on an adjacent disc are threaded for achieving a screwed connection therebetween.

5. The method as defined in claim 1 for producing a rotor made from welded-together discs wherein means including a sleeve receiving centrally located bosses on adjacent discs are provided for assembling the discs in axial alignment and centering and said sleeve includes a container filled with an inert gas and which is punctured by one of the bosses as the discs are brought together thereby releasing the inert gas into a cavity located between the discs for use in performing the welding operation.

6. The method as defined in claim 1 for producing a rotor made from welded-together discs wherein the steps of pre-heating the discs prior to welding, heat-treating the completed rotor and subjecting the completed rotor to a hot true-running test are accomplished by circulating a hot gaseous fluid over the discs.

7. The method as defined in claim 1 for producing a rotor made from welded-together discs wherein said common enclosure is comprised of a number of axial modules which are joined in succession as the discs are likewise welded together in succession to provide a correspondingly increasing axial length.

8. The method as defined in claim 1 for producing a rotor made from welded-together discs wherein the step of welding together each two discs is performed in two stages, the first welding stage being a root weld and the second stage being a filler weld, and wherein the next disc to be welded on is pre-heated during application of the filler weld in the presence of a circulating hot gaseous fluid.

9. The method as defined in claim 1 for producing a rotor made from welded-together discs wherein the step of welding together each two discs is carried out by means of an electron beam and wherein the next-to-be-welded-on disc is being preheated during the welding operation.

10. The method as defined in claim 9 for producing a rotor made from welded-together discs wherein the electron beam strikes the weld site on a line forming an angle to a radius extending from the axis of the disc through the weld site.

11. Apparatus for producing a rotor made from discs joined together in succession in side-by-side relation by welding and wherein the end discs which complete the rotor are provided with shaft extensions which comprises a heating box having an extendible enclosure, means for mounting one of the end discs for rotation about its axis in said heating box, welding means for welding the discs together, a trolley located in said heating box on which is supported the next disc to be welded to said end disc and also thereafter further discs to be welded in succession accompanied by extension of said enclosure until the complete rotor has been built up by welding on the other end disc, said trolley including means for pressing the disc thereon into a pressurized face-to-face contact with a preceding disc, a rest located within said heating box for supporting the partially completed rotor as the discs are welded together in succession, means for mounting the other end disc which completes the rotor for rotation for subsequent testing of the completed rotor for hot true-running within said heating box and means for supplying heat to the interior of said box.

12. Apparatus as defined in claim 11 for producing a rotor made from discs successively welded together in side-by-side relation wherein said means provided on said trolley for pressing the disc supported thereon into a pressurized face-to-face contact with a preceding disc includes a centering device.

13. Apparatus as defined in claim 11 for producing a rotor made from discs successively welded together in side-by-side relation wherein the next disc to be welded is supported on said trolley by means of a spring-loaded rest of adjustable diameter.

14. Apparatus as defined in claim 11 for producing a rotor made from discs successively welded together in side-by-side relation wherein said heating box is constituted by a number of axial modules joined together in succession to provide a correspondingly increasing axial length.

15. Apparatus as defined in claim 11 for producing a rotor made from discs successively welded together in side-by-side relation and which further includes means for supplying said heating box with a hot gaseous fluid which is circulated through the heating box by means of a blower.

16. Apparatus as defined in claim 15 wherein the hot gaseous fluid for heating the rotor is introduced into said heating box through an inlet located at the end thereof at which the first end disc is welded to the next adjacent disc.

17. Apparatus as defined in claim 15 wherein the hot gaseous fluid for heating the rotor is introduced into said heating box through an inlet in such manner that the gas flow is tangential to the rotor axis.

* * * * *